United States Patent Office 3,149,917
Patented Sept. 22, 1964

3,149,917
PROCESS FOR THE PRODUCTION OF THE
RED OXIDE OF MERCURY
Eugene L. Cadmus, Glen Ridge, and Leslie Lipschitz, Paterson, N.J., assignors to Wood Ridge Chemical Corporation, Wood-Ridge, N.J., a corporation of Nevada
No Drawing. Filed Jan. 14, 1963, Ser. No. 251,016
12 Claims. (Cl. 23—183)

This invention relates to the production of red oxide of mercury.

More particularly this invention relates to a novel process for the production of red oxide of mercury from mercuric nitrate and sodium hydroxide.

One object of the present invention is the provision of a one-step process for the production of red oxide of mercury from mercuric nitrate and sodium hydroxide.

Another object of this invention is to provide a process for the production of red oxide of mercury, in which the particle size and density of the product can be readily controlled.

These and other objects of the present invention will be apparent from the ensuing description.

In general, the objects of the present invention can be accomplished by simultaneously adding mercuric nitrate and sodium hydroxide to water with agitation at an elevated temperature while maintaining the reaction mixture at a controlled alkalinity.

More specifically the aforesaid mercuric oxide and sodium hydroxide are simultaneously added in the form of their aqueous solutions while maintaining the alkalinity of the resulting reaction mixture at from about 0.1 to about 0.6 N.

In a preferred embodiment of the present invention aqueous solutions of mercuric oxide and sodium hydroxide are simultaneously added to aqueous sodium chloride.

It is surprising and unexpected that the process of the present invention should produce red oxide of mercury, since it is well known in the art that mercuric nitrate and sodium hydroxide react to form yellow oxide of mercury. The mechanism by which the novel process of the present invention produces red oxide of mercury is not thoroughly understood. It has been found that the presence of substantial quantities of sodium chloride and/or maintenance of the amounts of ingredients and process conditions within critical limits influences the reaction to produce red oxide of mercury, rather than yellow oxide of mercury.

In the preferred embodiment of the present invention the aqueous mixture of sodium chloride can be a solution or alternatively can be a slurry containing only a minimal quantity of water. The elevated temperature at which the process of the present invention is carried out is above about 80° C., preferably in the range from about 80° C. to about 125° C., with optimum results obtainable in the range of from about 100° C. to about 110° C.

The proportions of mercuric nitrate and sodium hydroxide, and the rate of addition of these ingredients should be controlled within close limits to maintain the alkalinity of the reaction mixture at a normality (N) of between about 0.1 and about 0.6 N, and preferably between about 0.2 and about 0.5 N. It has been found that at least 24 parts by weight of sodium hydroxide are required per 100 parts by weight of mercuric nitrate to maintain the solution at an alkalinity within these limits, and to afford complete conversion. The use of less than this amount raises the acidity of the reaction mixture to a normality substantially below 0.1 N in base, resulting in incomplete conversion and contamination of the product with chlorine-containing compounds. It is preferred to utilize a quantity of sodium hydroxide in excess of 24 parts by weight per 100 parts of mercuric nitrate for rapid conversion and maximum yields. However, large excesses of sodium hydroxide, for example, above about 60 parts by weight sodium hydroxide per 100 parts by weight mercuric nitrate should not be used, as the reaction mixture would be too alkaline, i.e. above about 0.6 N, forming the yellow oxide of mercury rather than the desired red oxide of mercury.

The rate of simultaneous addition of the sodium hydroxide and mercuric nitrate solutions must be held constant in order to yield a product having a substantially homogeneous particle size and density. Generally, an increase in the rate of addition, decreases both the particle size and the density. The addition rate will be selected so as to maintain the alkalinity of the reaction mixture within the above limits at the selected concentration of the ingredients. Within these limits, the addition rate can be varied to obtain a product of desired particle size and density.

As stated above, the formation of the red oxide of mercury in the process of this invention is at least partially dependent on the alkalinity of the reaction solution. Thus the alkalinity or acidity of the reaction solution must be closely controlled throughout the reaction. The alkalinity or acidity of the reaction solution can be maintained at a predetermined level by either the slow simultaneous addition of sodium hydroxide and mercuric nitrate to water or the simultaneous addition of these ingredients at a constant higher rate into an aqueous solution of sodium chloride. The latter method is preferred, since the former method is not commercially economical due to the slow reaction rate and the resulting product which has a small particle size, in the range of 4 to 7 microns, and a low density, e.g. 20 to 35 grams per cubic inch. The use of sodium chloride is also preferred since increases in the amount of that ingredient increase the particle size and density of the product.

While the exact proportion of sodium chloride is not critical, it has been found that at least 35 parts by weight of sodium chloride per 100 parts of mercuric nitrate are required for conversion to a red oxide of mercury product having a particle size of 7 to 25 microns and density in the range of 20 to 75 grams per cubic inch. Increased amounts of sodium chloride can be used to obtain a red oxide product having a larger particle size and a greater density.

After the conversion is complete, the red oxide of mercury, having precipitated during the intimate mixing, is separated from the soluble by-products and unreacted materials by decantation. The red oxide of mercury thus obtained has many uses as such or can be washed, filtered and dried to yield the commercially desirable product.

As one of the many advantages of the process of the present invention, very little mercury, in the order of 5 parts per million or less, will appear in the by-products, filtrate, and wash water when excess sodium hydroxide and sodium chloride are used as described herein, and the mixture and wash water are kept at least slightly alkaline throughout the decantation and purification procedures. The small amount of mercury in the supernatant liquid and wash water permit their safe and inexpensive disposal and thereby provide an advantage over other processes which produce waste streams containing large amounts of highly toxic soluble mercury compounds.

As a further embodiment of this invention the aqueous mixture of sodium chloride can also contain a minor proportion of sodium carbonate. The inclusion of a minor proportion of sodium carbonate in the said mixture assists in the control of the alkalinity of the reaction mixture and the density of the product. Only minor amounts are required, for example, amounts in the order of 1 to 10 parts of by weight sodium carbonate per 100 parts by weight of mercuric nitrate have been found to be effective in controlling the density of the product.

The physical properties of the red oxide of mercury produced by the process of this invention can be varied over a wide range by adjusting the concentration of the ingredients and the rate of addition within the limits stated above. For example, the density of the product is influenced by the concentration and volume of the sodium chloride mixture. Thus, generally the density of the product increases with an increase in the quantity of sodium chloride. Moreover, dilution of the reactants at a constant quantity of saturated sodium chloride solution also increases the density of the product.

Similarly the particle size of the product is also partly controlled by the concentration and addition rate of the mercuric nitrate and sodium hydroxide solutions. For example, the particle size of the product decreases as the addition rate of the solutions increases. Thus, to obtain a larger particle size, the addition rate is decreased.

The process of the present invention and the control of the physical properties by adjustment of the process variables will be more readily understood from the following examples, which are presented to illustrate the invention, but not to restrict the invention thereto.

*Example 1*

An aqueous slurry of sodium chloride (200 pounds) was charged to a glass-lined, steam-jacketed kettle, equipped with an agitator. The slurry was heated to 100–105° C. with steam and agitated. An aqueous solution (30 gallons; 11.13 N) of mercuric nitrate (281 pounds) and an aqueous solution (27 gallons; 11.65 N) of sodium hydroxide (105 pounds) were simultaneously added to the kettle at a rate of 3 gallons per minute, while the contents of the kettle were maintained at 100–105° C. After the addition was completed, the reaction mixture which had an alkalinity of about 0.2 N, was decanted and the precipitated red oxide of mercury washed with water, vacuum filtered and dried. The red oxide of mercury thus produced had an average particle size of 11.4 microns and an average density of 62.0 grams per cubic inch.

*Example 2*

An aqueous solution (32 gallons) of sodium chloride (90 pounds) and sodium carbonate (3 pounds) having an alkalinity of 0.206 N, was charged to the kettle described in Example 1, heated to 100–105° C. and agitated. An aqueous solution (57 gallons; 5.97 N) of mercuric nitrate (246 pounds) and an aqueous solution (57 gallons; 5.90 N) of sodium hydroxide (113 pounds) were simultaneously added to the kettle at a rate of 3 gallons per minute. After the addition was complete the reaction mixture had a volume of 96 gallons and an alkalinity of 0.17 N. The red oxide of mercury was recovered therefrom as described in the previous example, to yield the product having an average particle size of 9.9 microns and an average density of 49.0 grams per cubic inch.

*Example 3*

An aqueous solution (64 gallons) of sodium chloride (180 pounds) and sodium carbonate (6 pounds), having an alkalinity of 0.210 N, was charged to the kettle detailed in the previous examples and heated as described therein. An aqueous solution (30 gallons; 9.1 N) of mercuric nitrate (229 pounds) and an aqueous solution (30 gallons; 9.2 N) of sodium hydroxide (93 pounds) were simultaneously added to the kettle at a rate of 1 gallon per minute.

After the addition was complete, the reaction mixture, which had a volume of 124 gallons and an alkalinity of 0.16 N, was processed as described in Example 1 to recover red oxide of mercury having an average particle size of 23.9 microns and an average density of 70.2 grams per cubic inch.

*Example 4*

Two 32 gallon portions of saturated sodium chloride solution (specific gravity 1.2) containing sodium carbonate (0.2 N) were charged to separate kettles of the type described in Example 1, hated to 100–105° C., and agitated. Aqueous solutions of mercuric nitrate (33 gallons; 4.41 N based on HgO, and 4.87 N based on $HNO_3$) and sodium hydroxide (31 gallons; 5.12 N) were added simultaneously to each kettle. However, the aqueous solutions were added to kettle No. 1 at a rate of 3 gallons per minute, whereas the aqueous solutions were added to kettle No. 2 at a rate of 1 gallon per minute. After the additions were complete, the reaction mixture in kettle No. 1 had a volume of 87.5 gallons and an alkalinity of 0.19 N, while the reaction mixture in kettle No. 2 had a volume of 96 gallons and an alkalinity of 0.17 N. The reaction mixtures were treated as described in the previous examples to recover red oxide of mercury having the following properties:

| Kettle No. | Red Oxide of Mercury Product | |
|---|---|---|
| | Particle Size, Microns | Density, gms./cu. in. |
| 1 | 5 | 38 |
| 2 | 16.5 | 55 |

*Example 5*

To an agitated saturated sodium chloride solution (500 ml.; specific gravity, 1.2), aqueous solutions of mercuric nitrate (200 ml.; 10.70 N based on both mercury and nitric acid) and sodium hydroxide (200 ml.; 10.70 N) were added simultaneously at a rate of 1.1 ml. per minute over a period of 177 minutes, while the reaction mixture was maintained at 107–8° C. After the addition was completed, the reaction mixture, which had an alkalinity of about 0.6 N, was decanted and the precipitated red oxide of mercury washed with water, vacuum filtered and dried. The red oxide of mercury thus produced had an assay of 99.60%, an average particle size of 5.2 microns and a density of 28 grams per cubic inch.

*Example 6*

Aqueous solutions of mercuric nitrate (105 ml.; 11.03 N based on mercury and 11.86 N based on $HNO_3$) and sodium hydroxide (105 ml.; 11.85 N) were simultaneously added to agitated distilled water (100 ml.) heated to 100°–110° C., at a rate of about 5 ml. per minute over a period of 20 minutes. After the addition was completed the reaction mixture, which had an alkalinity of about 0.1 N was decanted and the precipitated red oxide of mercury washed with water, vacuum filtered and dried to yield red oxide of mercury as an orange solid having an average particle size of 5 microns and a density of 33 grams per cubic inch.

We claim:

1. A process for the production of red oxide of mercury which comprises simultaneously adding mercuric nitrate and sodium hydroxide to water with agitation at a temperature above about 80° C. while maintaining the alkalinity of the reaction mixture at from about 0.1 to about 0.6 N; and recovering the red oxide of mercury precipitated from the reaction mixture by separating the liquids therefrom.

2. A process for the production of red oxide of mercury which comprises simultaneously adding aqueous solutions of mercuric nitrate and sodium hydroxide to water with agitation at a temperature above about 80° C., while maintaining the alkalinity of the reaction mixture at from about 0.1 to about 0.6 N; and recovering the red oxide of mercury precipitated from the reaction mixture by separating the liquids therefrom.

3. A process for the production of red oxide of mercury which comprises simultaneously adding aqueous solutions of mercuric nitrate and sodium hydroxide to an agitated aqueous mixture of sodium chloride in proportions to form a solution having an alkalinity of between about 0.1 to about 0.6 N at a temperature above about 80° C. while maintaining the alkalinity of the reaction mixture at the said normality; and recovering the red oxide of mercury precipitated from the reaction mixture by separating the liquids therefrom.

4. A proces for the production of red oxide of mercury having a particle size of from about 3 to about 7 microns which comprises simultaneously adding aqueous solutions of mercuric nitrate and sodium hydroxide to water with agitation in sufficient proportions to form a solution having an alkalinity of between about 0.1 and about 0.6 N at a temperature above about 100° C. while maintaining the alkalinity of the reaction mixture at the said normality; and recovering the red oxide of mercury precipitated from the reaction mixture by separating the liquids therefrom.

5. A process for the production of red oxide of mercury which comprises simultaneously adding aqueous solutions of mercuric nitrate and sodium hydroxide to an agitated aqueous mixture of sodium chloride in sufficient proportions to form a solution having an alkalinity of between about 0.1 and about 0.6 N at a temperature of from about 80° to about 125° C., while maintaining the alkalinity of the solution at the said normality; and filtering the resulting mixture to separate and recover red oxide of mercury formed in the process.

6. A process for the production of red oxide of mercury having a particle size of from about 3 to about 7 microns and a density of from about 20 to about 35 grams per cubic inch, which comprises simultaneously adding an aqueous solution of mercuric nitrate and an aqueous solution of sodium hydroxide in a proportion of at least 24 parts by weight sodium hydroxide per 100 parts by weight of mercuric nitrate, to water with agitation at a rate to form a solution having an alkalinity of between about 0.1 and about 0.6 N at a temperature of from about 100° C. to about the boiling point of the reaction mixture, while maintaining the alkalinity of the solution at the said normality; and recovering the red oxide of mercury precipitated from the reaction mixture by separating the liquids therefrom.

7. A process for the production of red oxide of mercury which comprises simultaneously adding an aqueous solution of mercuric nitrate and an aqueous solution of sodium hydroxide in a proportion of at least 24 parts by weight of sodium hydroxide per 100 parts by weight of mercuric nitrate, to an agitated aqueous mixture of sodium chloride, containing at least 35 parts by weight of sodium chloride per 100 parts by weight of mercuric nitrate in the first solution, at a rate to form a solution having an alkalinity of between about 0.1 and about 0.6 N at a temperature above about 80° C., while maintaining the alkalinity of the mixture at the said normality; and recovering the red oxide of mercury precipitated from the reaction mixture by separating the liquids therefrom.

8. A process for the production of red oxide of mercury which comprises simultaneously adding an aqueous solution of mercuric nitrate and an aqueous solution of sodium hydroxide in a proportion of at least 24 parts by weight of sodium hydroxide per 100 parts by weight of mercuric nitrate, to an agitated aqueous mixture of sodium chloride containing at least 35 parts by weight sodium chloride per 100 parts by weight mercuric nitrate in the first solution, at a rate to form a solution having an alkalinity of between about 0.1 and about 0.6 N at a temperature of from about 80° C. to about 125° C., while maintaining the alkalinity of the solution at the said normality; and filtering the resulting mixture to recover red oxide of mercury formed in the process.

9. A process for the production of red oxide of mercury which comprises simultaneously adding aqueous solutions of mercuric nitrate and sodium hydroxide in a proportion of at least 24 parts by weight of sodium hydroxide per 100 parts by weight of mercuric nitrate, to an agitated aqueous mixture of a major proportion of sodium chloride and a minor proportion of sodium carbonate at a temperature above about 80° C., forming a solution having an alkalinity of between about 0.1 and about 0.6 N; and recovering the red oxide of mercury precipitated from the reaction mixture by separating the liquids therefrom.

10. A process for the production of red oxide of mercury which comprises simultaneously adding an aqueous solution of mercuric nitrate and an aqueous solution of sodium hydroxide in a proportion of at least 24 parts by weight sodium hydroxide per 100 parts by weight mercuric nitrate, to an agitated aqueous mixture of sodium chloride and a minor proportion of sodium carbonate, said mixture containing at least 35 parts by weight of sodium chloride per 100 parts by weight mercuric nitrate in the first solution, at a rate to form a solution having an alkalinity of between about 0.1 and about 0.6 N at a temperature of from about 80° to about 125° C., while maintaining the alkalinity of the solution at the said normality; and filtering the resulting mixture to recover red oxide of mercury.

11. In a process for the production of red oxide of mercury from mercuric nitrate and caustic soda, the improvement which comprises simultaneously adding aqueous solutions of said mercuric nitrate and caustic soda to an agitated aqueous mixture of sodium chloride containing at least 35 parts by weight of sodium chloride per 100 parts by weight mercuric nitrate in the first solution, at a rate to form a solution having an alkalinity of between about 0.1 and about 0.6 N at a temperature of from about 80° to about 125° C., while maintaining the alkalinity of the solution at the said normality; and recovering the red oxide of mercury precipitated from the reaction mixture by separating the liquids therefrom.

12. In a process for the production of red oxide of mercury from mercuric nitrate and caustic soda, the improvement which comprises simultaneously adding aqueous solutions of mercuric nitrate and caustic soda to an agitated aqueous mixture of sodium chloride and a minor proportion of sodium carbonate, said mixture containing at least 35 parts by weight of sodium chloride per 100 parts by weight mercuric nitrate in the first solution, at a rate sufficient to obtain a solution having an alkalinity of between about 0.1 and about 0.6 N at a temperature of from about 80° to about 125° C., while maintaining the alkalinity of the solution at the said normality; and filtering the resulting mixture to recover red oxide of mercury.

References Cited in the file of this patent

J. W. Mellor's "A Comprehensive Treatise on Inorganic and Theoretical Chemistry," vol. 4, 1923 ed., page 772, Longmans, Green and Co., N.Y.